Patented June 21, 1927.

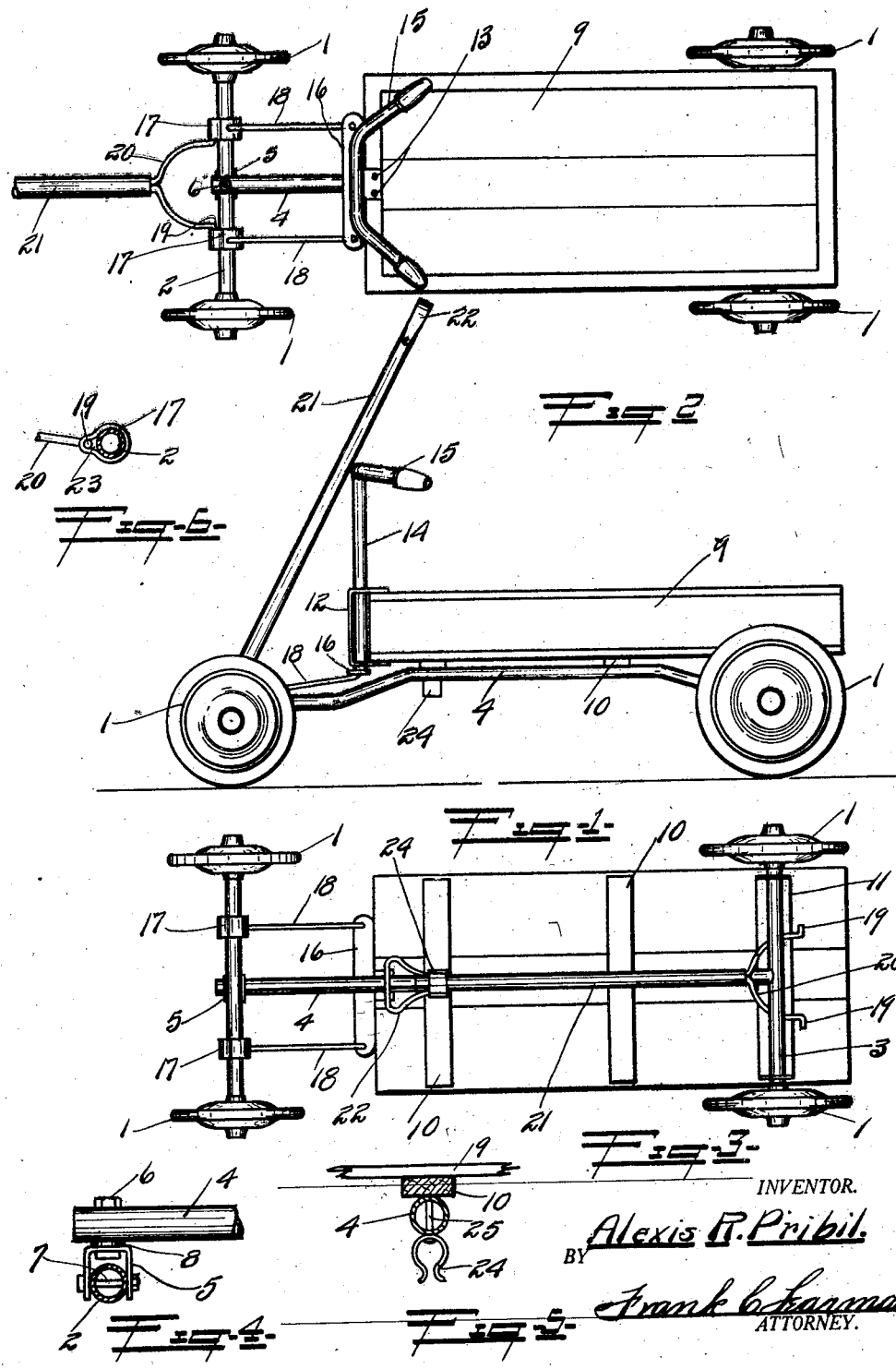

1,633,272

UNITED STATES PATENT OFFICE.

ALEXIS R. PRIBIL, OF SAGINAW, MICHIGAN.

COASTER WAGON.

Application filed September 27, 1924. Serial No. 740,245.

This invention relates to coaster wagons and the like and particularly to a wheeled vehicle such as used by children.

One object of the invention is to design a neat and substantial non-tipable coaster wagon which is very simple to manufacture and economical to build and assemble.

Another object is to design a coaster wagon having a detachable handle, and convenient means for carrying the same when detached.

A further object is to design a coaster wagon provided with a handle for pulling it in the conventional manner and also having a steering bar for guiding the structure when coasting or when being pushed by another person or means.

With the above and other objects in view, the present invention consists in the combination and arrangement of parts, hereinafter more fully described, illustrated in the accompanying drawing, and particularly pointed out in the appended claims, it being understood that changes may be made in the form, size and proportion without departing from the spirit, or sacrificing any of the advantages of the invention.

In the drawing.

Fig. 1 is a side view of my improved coaster wagon.

Fig. 2 is a top plan view thereof.

Fig. 3 is an inverted bottom view.

Fig. 4 is an enlarged frame detail illustrating the connection of the center piece or backbone to the front axle.

Fig. 5 is a front view of the clip in which the handle is placed after it is detached from the wagon, the backbone being shown in section.

Fig. 6 is a detail end view of the connection for securing the handle in place.

Referring now particularly to the drawing in which I have shown the preferred embodiment of my invention, the numeral 1 indicates the ground engaging wheels which are revolubly mounted on the front and rear axle members 2 and 3 respectively, and which together with the longitudinally extending center brace or member 4 which is welded to the rear axle comprises the frame. The front end of this center brace 4 is pivotally secured to a yoke 5 by means of the bolt 6, this yoke in turn embracing the front axle 2, and being held by means of a bolt 7 in the usual manner, a washer 8 being interposed between the yoke and the member 4 as shown, and it will be obvious that this front connection will allow the axle to turn as desired, while the yoke 5 prevents the wagon from tipping as the yoke is pivotally secured to the axle.

A conventional body 9 is mounted on this frame, and is provided with transversely disposed spaced apart braces 10 to which the frame is secured, a bracket 11 engaging the rear axle and supporting the rear end of the body in the usual manner.

A small bracket 12 is secured to the front end of the wagon by means of screws 13 or the like, and a vertically projecting tube or bar 14 extends through suitable openings therein. Handle bars 15 are secured to the upper end of this tube, the lower end being secured to a transversely disposed radius plate 16 in any approved manner.

The front axle is provided with spaced apart metal clips 17 to which the rods 18 are connected, suitable openings being provided in the radius plate 16 and to which the opposite ends of the rods 18 are connected, and it will be obvious that by manipulation of the handle bars the front axle can be turned and the wagon guided as desired. The front portions of the clips 17 are formed as clearly shown in Fig. 6 of the drawing, and are adapted to detachably receive the bent ends 19 of the handle 20, said handle being formed with resilient curved forked ends, which converge and are secured in a pipe member 21 to which a handle 22 is riveted.

When pulling the wagon the curved ends of the handle are sprung to allow the ends 19 to be inserted in the openings 23 in the clips as clearly shown in Figs. 1 and 2 of the drawing, but when desiring to coast or otherwise propel the wagon, the handle is detached and placed in the resilient clip 24 which is secured to the frame by means of the bolt 25, the forked end resting on the rear axle, this provides a very convenient place and manner of carrying the handle, and it can be very quickly attached or detached when desired.

From the foregoing description it will be obvious that I have perfected a very simple and substantial non-tipable coaster wagon having a detachable handle which can be quickly applied to or detached from the wagon.

What I claim is:—

1. A non-tipable coaster wagon comprising front and rear axle members, a tubular longitudinally extending brace integral with the rear axle, a body mounted on said rear axle and secured to said tubular brace to the rear of the front axle, a yoke pivotally mounted on the front axle and to which said brace is pivotally connected, resilient clips frictionally secured to the front axle and loops formed in said clips to which a draft handle is adapted to be detachably secured.

2. A non-tipable coaster wagon comprising front and rear axle members, a body mounted thereon and to the rear of the front axle, a longitudinally extending brace member integral with the rear axle, a yoke pivotally connected to the front axle and to which said brace is pivotally connected, a steering bar mounted on the body, a radius plate mounted on the bar, spaced apart resilient clips frictionally secured to the front axle, rods connecting the clips and radius bar, said clips each having a forwardly extending loop to which a draft handle is adapted to be detachably secured.

In testimony whereof I affix my signature.

ALEXIS R. PRIBIL.